March 19, 1968     J. A. McCABE     3,373,563

RADIOISOTOPE SUBLIMING SOLID PROPULSION SYSTEM

Filed Dec. 16, 1965

JAMES A. McCABE
*INVENTOR.*

BY *Charles T. Woodward*

ATTORNEY 3,373,563
RADIOISOTOPE SUBLIMING SOLID
PROPULSION SYSTEM
James A. McCabe, Fort Forth, Tex., assignor to General
Dynamics Corporation, Fort Worth, Tex., a corporation of Delaware
Filed Dec. 16, 1965, Ser. No. 514,268
6 Claims. (Cl. 60—203)

ABSTRACT OF THE DISCLOSURE

A gas generating device in composite unit form consisting in combination of a radioisotope material to provide a heat source, a vessel containing subliming solid propellant exhibiting a relatively low molecular weight in the vapor phase, and a pressure or temperature regulated radioisotope flow control loop, the device having control means for directing the resultant high temperature thrust gases.

---

The present invention relates generally to reaction propulsion systems.

More particularly, the invention relates to a reaction thrust producing propulsion system which is especially adapted to provide simple, reliable operation for space engine applications, where low thrust, simple operation and long term mission capability are operational requisites.

The prior art

The need for such a system has been recognized for more than a decade and the state-of-the-art has accordingly been advanced to a modest degree by several propulsion systems which have been evolved in attempts to meet such objectives. The nearest approach to the presently invented system employs a bed of radioisotope fuel capsules to heat gaseous hydrogen as it vaporizes or "boils off" from a tank where it is stored as a cryogenic liquid. In such a cryogenic system hydrogen gas flows through an enclosed annular passage surrounding the radioisotope capsules, is heated to a high temperature during its passage and is subsequently expelled from a nozzle to produce thrust.

Several disadvantages are inherent in such a system and sought-for effects are mitigated to a considerable extent by several deleterious factors. Because of the short exposure time of the gas in its passage over the radioisotope capsules, a relatively large amount of expensive and relatively scarce radioisotope material must be used to provide the large heat flux necessary to increase its enthalpy, i.e., to elevate its temperature. Such large concentration of radioisotope mass, in turn, requires active cooling to avoid detrimental structural effects, especially when the system is not thrusting. In the above referred to system of the prior art, cooling is effected by the circulation of water which detrimentally increases the weight and complexity of the entire propulsion system. Further, the use of liquid hydrogen unduly complicates propellant handling and loading; imposes onerous problems on structural design and thermal control considerations and severely restricts system application to the performance of missions of short duration.

An additional disadvantage that is inherent in a system of this class in character resides in the fact that specific impulse decreases with the passage of time due to the exponential decay of radioisotope power. In effect, this means that system efficiency as regards propellant utilization is continually on the decline.

A further disadvantage is innate in the certitude that response and decay times are protracted because of the residual or "dribble" volume of propellant in the radioisotope bed.

The presently invented thrust apparatus, as hereinafter disclosed, provides a propulsion system in which considerably less radioisotope mass is required since the usable radioisotope material is continually in direct thermal contact with the object propellant, regardless of whether the system is thrusting or abeyant. Heat transfer to the thrust gases is continuous, substantially more thermal efficiency is realized and no severe temperature gradients at the gas-capsule interface exist. The propellant, being a solid, is easily handled and stored as well as being adaptable to deep space missions of long duration. Furthermore, the specific impulse of the preferred embodiment, herein disclosed, never falls below a prescribed minimum value. Such minimum value for specific impulse is, in fact, established by the pressure or temperature switch setting, as will be subsequently shown, since for any vapor or dissociation pressure of the gas in the tank there exists a corresponding equilibrium temperature. Response and decay characteristics are substantially superior to those of the aforementioned known art system inasmuch as the residual or dribble volume is maintained at a minimum.

A substantial number of materials are characterized as subliming solids, since these have the inherent capability of conversion from the solid state to the gaseous or vapor state without at any time appearing in the liquid state, when the transition occurs below the triple point of the material.

Preferentially selected for their gas generation and reaction thrust producing qualities are those subliming solids which effect a sufficient vapor pressure to sustain thrust at pre-selected design temperatures and which also exhibit a relatively low molecular weight in the vapor phase. In this category are a large number of the ammonia salts exemplified by ammonia carbamate $$(NH_4CO_2NH_2)$$

ammonium carbonate $(NH_4)_2CO_3$, ammonium bisulfide $(NH_4HS)$, ammonium bicarbonate $NH_4HCO_3$ ammonium acetate $(NH_4CH_3COOH)$, ammonium azide $$(NH_4N_3)$$

ammonium chloride $(NH_4Cl)$, ammonium formate $$(NH_4COOH)$$

ammonium cyanate $(NH_4OCN)$, ammonium cyanide $(NH_4CN)$, ammonium peroxy borate $$(NH_4BO_3 \cdot 1/2H_2O)$$

ammonium fluoride $(NH_4F)$, and hydrogen fluoride $(NH_4HF_2)$, monomethylamine carbamate $$(CH_3NH_3CO_2NHCH_3)$$

ethyl boric acid $((C_2H_5)B(OH)_2)$, di-methyl beryllium $(Be(CH_3)_2)$, methyl boric acid $(CH_3B(OH)_2)$, and beryllium borohydrate $(BeB_2H_8)$. These preferred chemical compounds however, do not preclude the use, within the scope of the invention, of many other chemical and metallic substances both organic and inorganic which are subliming in character.

Accordingly, it is an object of the present invention to to provide a low thrust, secondary propulsion sytem which employs a radioisotope heat source for sublimation of a solid propellant to generate thrust gases.

Another object of the invention is to provide an effective and efficient secondary propulsion system for space applications where low thrust is an operational desideratum.

A further object is to provide a secondary propulsion system for space applications requiring simple but reliable operation.

Yet another object is to provide a low thrust, secondary propulsion system for space applications, in which structural form and functional modes are sufficiently complementary as to engender substantial weight advantages over other devices of this category in the known art.

A yet further object is to provide a thrust producing apparatus of the present class and character which is inherently imbued with a unique long-term space mission capability.

A still further object is to provide a low thrust gas generation system which manifests efficient fuel utilization and possesses very good response characteristics.

These and other features and objects of the invention will be more apparent to those skilled in the art upon a consideration of the appended drawings and following description wherein several constructional forms of apparatus for carrying out the invention are disclosed.

Figure 1:
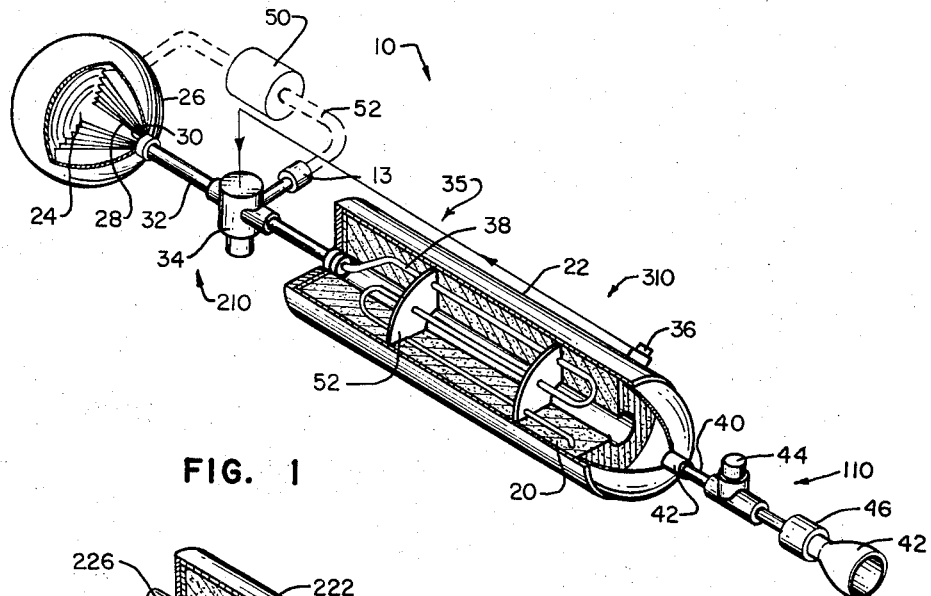
FIGURE 1 is an isometric, cut-away view which illustrates space engine apparatus embodying the preferred form of the invention.

Referring now to the drawings, FIGURE 1 shows a rocket reaction type, thrust producing space engine composite 10 having a nozzle component 110, isotopic activator component 210 and propellant subliming body component 310 which integrally embodies the several structural and functional features which best exemplify the invention.

A subliming solid propellant 20, such as ammonium bisulfide ($NH_4HS$) or ammonium carbamate

is contained within cylindrical propellant-subliming body 22. A radioisotope solution 24, such as plutonium 238 or polonium 210 dissolved in nitric or halogen acid, is contained within spherical tank 26, which also embodies a plurality of concentric, conical baffles 28 to assure containment of liquid around tank outlet 30. Flow of the radioisotope solution 24 to propellant tank 22 through tubular conduit 32 is monitored by a 3-way control valve 34 suitably interposed in conduit 32 between tanks 22 and 26. Switch 36 on activator component 310 senses gas pressure in propellant tank 22 and directs flow control valve 34, through appropriate conventional electrical circuitry (shown schematically by circuit 35), to admit radioisotope solution 24 into component 310 through heat exchanger manifold 38 which is embedded and positioned within subliming solid 20 by retainer plates 52. It will be obvious to those skilled in the art that a temperature sensing switch could be substituted for pressure sensing switch 36 and that valve 34 could be actuated equally as well by a change in temperature as by a change in pressure.

Flow of radioisotope solution 24 through conduit 32 is shut off at valve 34 when the upper limit setting of the switch 36 is attained.

Rearwardly extending thrust ejector component 110, fixedly attached to the outlet end of propellant subliming component 310, is interconnected thereto by outlet conduit 40 received into orificed fitting 42 and fixedly attached thereto. Conduit 40 serves to deliver sublimed thrust gas to thrust nozzle 42, through pressure regulator 44, which reduces the gas pressure to a nozzle exit value corresponding to some predetermined thrust level. Cut-off valve 46 of thruster component 110 controls flow of thrust gas to thrust nozzle 42.

In isotopic activator component 210, a service line conduit may be optionally employed, when required, for venting of heat exchanger manifold 38 or as a conduit for returning radioisotope solution 24 to isotopic activator tank 26 by the action of fluid pump 50, which is interposed in the optional return circuit conduit 52; the optional circuit pump and conduit being shown in phantom in relation to component 210.

In operation, space engine 10 is initially energized by activation of pressure sensitive switch 36, which in turn energizes appropriate electrical circuitry for activating flow control valve 34. Pressure switch 36, sensing an initial pressure in propellant tank 22 which is below the minimum predetermined magnitude, initiates a signal pulse through circuit 35 which directs flow control valve 34 to open to the pre-set degree. Hot radioisotope solution 24, consisting of an alpha-emitting radioisotope dissolved in nitric acid, or other suitable solvent, thereupon flows slowly into and through the conduit of heat exchanger manifold 38, which is intromitted in a matrix of solid subliming material 20, contained within propellant tank body 22.

Pressurization sufficient to effect the above-described flow emanates from inherent vapor pressure of the solution, as well as from helium gas generated during radioisotope decay. The high temperature of the radioisotope solution results from the conversion of the kinetic energy of the alpha particles into thermal energy of the solution.

When a predetermined and preset upper limit of pressure is reached, switch 36 directs flow control valve 34 to close, thereby terminating further radioisotope flow through manifold 38. To provide for the contingency of the gas pressure escalating severely after flow shut-off, a pressure relief valve (not shown) may be provided for propellant tank 22. A further provision for such contingency resides in the pressure relief afforded by returning the radioisotope solution in heat exchanger manifold 38 to tank 26 by return circuit 52 of component 210, previously described, or in the inherent thermal radiation of propellant tank 22.

After initial pressurization of propellant tank 22 within the magnitude of the established tolerable design range, it remains only for thrust demand circuitry of conventional design to open thruster cut-off valve 46 to effect desired thrusting reaction at nozzle 42.

Should propellant tank pressure degenerate sufficiently, however, as to fall below the prescribed level of thrust magnitude required, switch 36 will activate the propellant tank recharge cycle all over again. Such degeneration of pressure may be due to increased heat loss, propellant outflow and/or decay in radioisotope power.

Figure 2:
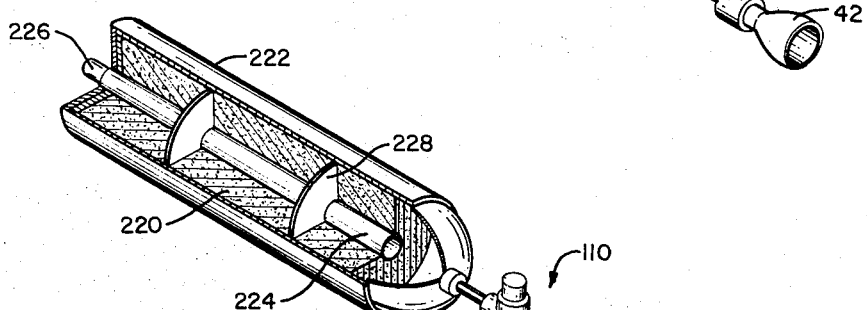
FIGURE 2 is an isometric, partially cut-away view of a second embodiment of the invention wherein radioisotope material is shown encapsulated.
Figure 3:
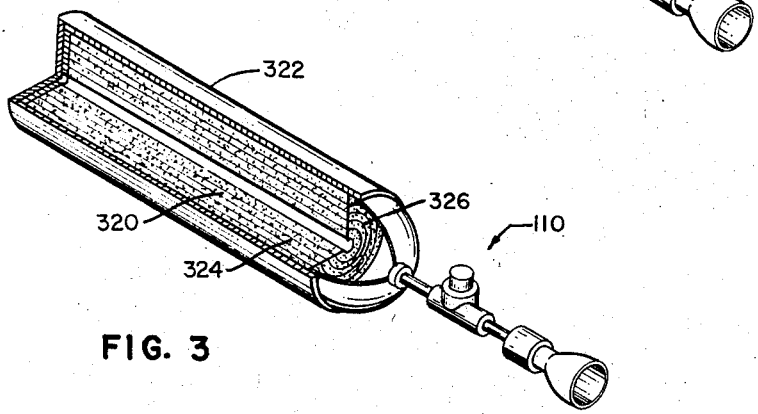
FIGURE 3 is an isometric, partially cut-away view of a modification of the apparatus of FIGURE 2.

Other embodiments of the invention employing alternate methods for generating thrust gases by subliming solids with radioisotope heat energy are shown in FIGURE 2 and FIGURE 3.

The embodiment shown in FIGURE 2 is similar to that of FIGURE 1 in that the subliming propellant 220 is contained within cylindrical propellant tank 222 and propulsion thrust nozzle component 110 is identical to that of FIGURE 1 and functions in like manner. However, in the embodiment of FIGURE 2, the heat producing radioisotope material is encapsulated within a container 224, which is made of a suitable material such as tungsten, and either embedded or slidably intromitted through retainer plates 228 into solid subliming propellant 220, contained in propellant tank body 222, in such manner as to place it in intimate thermal contact with the subliming solid. Thermal emission from the radioisotope substance thus provides heat of sublimation to the subliming solid to generate propulsion gas and create controlled thrust from nozzle component 110. An activator component such as 210, employed in the embodiment of FIGURE 1, is not required and therefore not employed in this corporeity.

In operation, this system is initially energized by intromittance of radioisotope container 224 into propellant subliming solid 220 via ingress fitting 226. Excess pressure within the radioisotope capsule is prevented by venting such helium gas as may be generated during radioisotope decay, or releasing it directly into the interior of tank 222, as desired. Excessive pressure which may develop within propellant tank 222 is accommodated by providing adequate structural integrity in selection of material and natural gage or alternately, such critical pressure may be avoided entirely by provision of a pressure relief valve. Optionally available, conventional thermal control measures, either active or passive, may be applied when desirable. Such measures may include use of movable clamshells or louvers as active devices (not shown) and for passive measures, appropriate thermal coatings may be applied to act as a thermal radiator.

In a further embodiment, as shown in FIGURE 3, the radioisotope material may be made integral with a carrier, such as silver foil or other suitable carrier material, by electrodeposition or by alloying the isotopic substance on a sheet-like material. The resulting radioisotope carrier 324 is arranged in the form of a plurality of concentrically spaced cylindrical elements 326; the subliming substance 320 completely filling the space between cylinders 326. In this manner the radioisotope foil 324 is placed in close thermal contact with subliming solid propellant 320 to thereby generate the desired thrust gas for propulsion. Propellant tank 322 and thrust ejector component 110 are identical both as to function and construction to their counterparts in the embodiment of FIGURE 2 and therefore are not described in detail in the present embodiment.

In operation of this embodiment, the radioisotope 324 again provides the heat of sublimation to the subliming solid 320, resulting in the generation of gas. Critical pressures are accommodated or avoided by the same techniques and in the same manner as described above for the embodiment of FIGURE 2. It is to be understood that the operation of the present device is not necessarily limited to the generation of sublimed gas solely for the purpose of providing reaction thrust for the propulsion of vehicles, but may also be readily employed as a gas generator for many diverse purposes, such as for the expulsion of propellant gases from tanks, the general purging of dangerous or otherwise undesirable gases from their containers, inflation of articles, pressurization and as a power source for servo systems and auxiliary power systems of various kinds. The foregoing disclosure is intended to cover all changes and modifications of the preferred embodiments of the invention described above by way of example, which do not constitute departures from the spirit and scope of the invention.

I claim:
1. A reaction thrust propulsion and gas generator device, comprising, in combination:
    (a) a casing defining a pressure chamber;
    (b) a subliming solid material contained within said pressure chamber;
    (c) a radioactive isotopic material in thermal communication with said subliming solid to impart the heat necessary to said solid for sublimation thereof and the generation of gas therefrom; and
    (d) means for emission of the sublimed gas from said chamber.

2. A reaction thrust propulsion and gas generator device, comprising, in combination:
    (a) a casing defining a pressure chamber;
    (b) a subliming solid material contained within said casing;
    (c) means operable to selectively bring a stored radioactive isotopic solution material into thermal communication with said subliming solid, resultant in the generation of gas therefrom, said means including in part pressurization of the radioactive isotopic storage means by the vapor pressure and radioactive isotopic decay, the resultant gas generation operable to impart flow to the solution;
    (d) means for regulating pressure generated within said chamber; and
    (e) demand responsive means operable to control emission of the sublimed gas from said chamber to produce useful work.

3. A reaction thrust and gas generating apparatus, comprising, in combination:
    (a) a casing defining a pressure chamber;
    (b) a laminate therein constituting alternate plies of
        a carrier material having a radioactive isotopic substance on at least one surface thereof, and
        a subliming solid material interposed therebetween, said laminae active for imparting heat to said solid subliming material to thereby generate gas, and
    (c) means for regulating pressure generated within said chamber, and
    (d) valve means operative to effect "on-off" thruster control by starting and stopping flow of gas through a nozzle.

4. A reaction thrust propulsion and gas generator device comprising, in combination:
    (a) a casing defining a pressure chamber;
    (b) a subliming solid material contained within said casing;
    (c) a capsule container positionable within said casing and said subliming solid material;
    (d) radioactive isotopic material contained within said capsule container in thermal communication with said subliming solid to impart the heat resultant in sublimation thereof and generation of gas therefrom; and
    (e) demand responsive means for the controlled emission of the sublimed gas from said pressure chamber.

5. A gas generator device comprising in combination:
    (a) a casing defining a pressure chamber;
    (b) a subliming solid material contained within said casing;
    (c) a container for storage of a radioactive isotopic material, said container being at least partially in substantially intimate contact with said subliming solid to bring the isotopic material into thermal communication therewith for the generation of gas;
    (d) means for regulating the pressure of the gas generated within said chamber; and
    (e) means operable to control emission of the sublimed gas from said chamber.

6. A gas generator device comprising in combination:
    (a) a casing defining a pressure chamber;
    (b) a subliming solid material contained within said casing;
    (c) a carrier for storage of a radioactive isotopic material at least partially in substantially intimate contact with said subliming solid to bring the radioactive isotopic material into thermal communication therewith causing sublimation of said solid material to thereby generate gas; and
    (d) emission control means to direct the sublimed gas from said chamber.

References Cited

UNITED STATES PATENTS

| | | | |
|---|---|---|---|
| 2,671,312 | 3/1954 | Roy | 60—39.48 X |
| 2,816,419 | 12/1957 | Mueller | 60—39.48 X |
| 3,022,190 | 2/1962 | Feldman | |
| 3,159,967 | 12/1964 | Webb | 60—202 |

FOREIGN PATENTS 1,002,469  8/1965  Great Britain.

CARLTON R. CROYLE, *Primary Examiner.*